(12) United States Patent
Torres et al.

(10) Patent No.: US 7,635,164 B2
(45) Date of Patent: Dec. 22, 2009

(54) THERAPEUTIC AUTOMATED AUTOMATICALLY CONTROLLED SHIFTING WHEELCHAIR SEAT

(76) Inventors: Hank Torres, 7 Ridgemeadow Way, Round Rock, TX (US) 78644; Randal Jay Marsden, 10815 Bearspaw Drive East, Edmonton, Alberta (CA) T6J 5E1

( * ) Notice: Subject to any disclaimer, the term of this patent is extended or adjusted under 35 U.S.C. 154(b) by 260 days.

(21) Appl. No.: 11/551,758

(22) Filed: Oct. 23, 2006

(65) Prior Publication Data

US 2008/0097254 A1    Apr. 24, 2008

(51) Int. Cl.
*B60K 1/00* (2006.01)
(52) U.S. Cl. .................................. 297/344.14
(58) Field of Classification Search ............. 297/344.1, 297/344.12, 344.15, 344.16, 344.18, 344.19, 297/344.2
See application file for complete search history.

(56) References Cited

U.S. PATENT DOCUMENTS

| | | | | |
|---|---|---|---|---|
| 5,320,409 A | * | 6/1994 | Katoh et al. ............. | 297/284.6 |
| 6,068,280 A | * | 5/2000 | Torres ..................... | 280/304.1 |
| 6,105,706 A | * | 8/2000 | Cooper ........................ | 180/282 |
| 6,715,784 B2 | * | 4/2004 | Koerlin et al. .............. | 280/650 |
| 7,246,856 B2 | * | 7/2007 | Kruse et al. ................. | 297/330 |
| 7,360,792 B2 | * | 4/2008 | Turturiello et al. .......... | 280/755 |

* cited by examiner

*Primary Examiner*—Joseph F Edell
(74) *Attorney, Agent, or Firm*—The Law Firm of H. Dale Langley, Jr., P.C.

(57) ABSTRACT

A controller module for a wheelchair automatically, automatedly adjusts position of the wheelchair seat with respect to the wheelchair base. The wheelchair seat is pivotally connected to the wheelchair base, for movement of the seat with respect to the base by a powered actuator. The controller module includes a microprocessor connected to the powered actuator for operating the powered actuator to move the seat. A sensor, such as a 3-axis sensor, is connected to the microprocessor. The microprocessor performs a programmed sequence, to periodically adjust the seat position when the wheelchair seat is occupied, through feedback from the sensor. The controller module can provide medical and therapeutic benefits by operations of periodically adjusting the seat position, thereby varying a wheelchair occupant's pressure contacts, weights, and loadings against the seat.

2 Claims, 3 Drawing Sheets

THERAPEUTIC AUTOMATED AUTOMATICALLY CONTROLLED SHIFTING WHEELCHAIR SEAT

BACKGROUND OF THE INVENTION

The present invention generally relates to wheelchairs, and more particularly relates to wheelchairs that are automated and automatically controlled to shift chair position of the wheelchair in relation to the wheelchair base, in order to vary contacts, pressures, weight, and loads of the occupant against the wheelchair seat.

An occupant of the seat of a conventional wheelchair is subjected to various weight, load, and pressure contacts with the seat. These contacts can be problematic to occupants, including those occupants with certain limited capability of movement, paralysis, body aches, pains, scars or regional afflictions, and otherwise. Body contact and weight loads with respect to the seat for prolonged periods cause discomfort, and can also cause adverse medical and therapeutic problems, to the wheelchair occupant. For example, the contact pressures and weight loads can restrict blood flow, crease and press particular skin and body points, bruise the body at support contacts, cramp and consequently stiffen stationary joints, muscles and connecting tissues, and other concerns.

Such problems to the seat occupant of conventional wheelchair seats can be even more acute when the occupant is unable to easily move or shift in the seat or, at periods, forgets to periodically shift or adjust seat position. An occupant watching television, working on computer, reading or otherwise preoccupied with matters, for example, may remain stationary in the same position for prolonged times. Blood flows can be restricted for extended periods when the occupant's position does not significantly change. Contact points, weight and loads of the occupant's body against the seat and with respect to gravity, can cause injury to the occupant, including, for example, because of formations of decubitis ulcers, rash, and other skin, body tissue, and skeletal afflictions.

Decubitis ulcers (i.e., pressure sores) are a particular problem to persons who may remain stationary, or from time to time in similar position, for extended time periods in a wheelchair seat (or against other support structure, such as a bed). The occupant's body contacts and supports the occupant against the wheelchair seat (or other support). Prolonged periods of immobility in this manner can cause ulcers, rash, injury, bruising, and other medical concerns. Decubitis ulcers, in particular, can lead to open wounds and infection and are quite serious health concerns. These ulcers at times require hospitalization, surgery, and other extensive treatment, and can even be precursors to more serious ailments, infection and death. At least one study has shown that decubitis ulcers are the second most frequently occurring health problem (e.g., first is bladder infections) in persons with paralysis and immobility because of spinal injury. Richardson, R. R., Meyer Jr., P. R., *"Prevalence and incidence of pressure sores in acute spinal cord injuries"*, 19(4) Paraplegia 23547 (1981).

Various conventional therapies attempt to reduce medical concerns from prolonged blood flow restriction because of body contacts, weight and loading against support surfaces. A typical practice has been to manually intermittently reposition or shift a person's body, with respect to support surfaces, in order to limit periods of continuous blood restriction. For wheelchairs (and other supports), cushions containing foams, pillows, liquids, gels and air pockets have been used. These cushions are typically manually handled and repositioned at intervals, intending to spread contacts of the occupant with the seat (or other support) across the surface of the cushions. A limited number of the cushions have included mechanical or other mechanisms to somewhat firm or soften various portions of the cushion, such as by manual variation or control to vary air pressure or other supports in pockets, balloons, compartments or the like. These cushions merely affect the extent of contact and direct skin pressure at the various points. They can not significantly vary weight loading or actual position of the occupant in the seat with respect to gravitational forces. These firm/soft cushions do not provide automated or automatic adjustment features or capabilities, and manual direction and adjustment are typically required.

A person who remains in a stationary position for extended periods, such as a wheelchair or bed occupant, has not only continuous points of contact with the seat (or support), but also continuous weight loadings and pressures of the body against the seat (or support). These continuous weight loadings and bodily pressures restrict blood flows, and conventional cushions can not, themselves, significantly vary these factors. As can be understood, blood restriction concerns can be particularly acute to those with limited mobility or who do not remember to move or shift. Health concerns, including decubitis ulcers, are caused and exacerbated by this prolonged restriction of blood flow.

Certain conventional wheelchairs include manually/physically operable mechanics that can shift the wheelchair seat, for example, to recline, tilt or angle the seat. Manual/physical movement and exertion by the wheelchair occupant (and/or another person) is required to make any shift adjustment. Shifting mechanisms, in certain instances, have included powered motors and the like to aid shift adjustment. But, the wheelchair occupant (or another person), in any event, must initiate and direct the shift via manually manipulated power switch, button or similar manual interface (and also must remember to do so).

In conventional wheelchairs that have certain powered adjustment features, powered adjustment can only occur if and when the occupant (or another assisting the occupant) manually handles physical controls to do so. Hand or body manipulation through a physical interface of switches, buttons or other manually triggered devices is required to initiate and direct the adjustment. Therefore, the wheelchair occupant (or another) must remember to make adjustment and also must have sufficient manual movability, dexterity and strength to manually initiate and direct the adjustment.

U.S. Pat. No. 6,030,351 of Schmidt is an example of an attempt to provide an alarm to alert the wheelchair occupant (or assistant) to intermittently manually operate shifting mechanisms. At periodic intervals, the timer alarm intermittently sounds to alert the wheelchair occupant to manually, by hand, shift or initiate shift of the wheelchair seat. The alarm is merely a reminder alert. The occupant (or another) must then, by hand and body movement, manually initiate and direct the seat shift. Seat adjustments are not automated or automatic, and occur only when manually initially and directed.

U.S. Pat. No. 6,068,280 of the same inventor hereof describes an automatic automated seat leveler, to level the wheelchair seat with respect to the base, when the base is not level. This U.S. Pat. No. 6,068,280 provides automated, automatic leveling of the wheelchair seat, for example, as the wheelchair base passes over or sits stationary on a non-level surface. Although leveling of the seat is automated and automatic in the design, any seat shift for reasons other than leveling requires conventional manual/physical movement of hand and/or body to initiate and direct shifts.

Wheelchair occupants who may remain immobile in the wheelchair seat for extended periods (including because of paralysis, limited strength, forgetfulness, or otherwise), will not necessarily receive medical or therapeutic benefit by the prior seat adjustment features, unless the seat is manually adjusted or manually/bodily controlled (by hand or body movement to operate mechanics) for powered adjustment at intervals. In many situations, the wheelchair occupant (or assistant) can fail, forget or otherwise not take the necessary manual/body actions. Even if manual adjustment is made, the extent or effect of adjustment can be inadequate, particularly if made by those with less dexterity or other impairment. Safety concerns are raised because of potential for improper manually initiated and made adjustment. Of course, those who are physically limited in movement, dexterity or strength can have trouble manually making proper adjustment, and this may present safety issues in addition to medical/therapeutic concerns. As a result, wheelchair occupants may remain substantially stationary in the seat for extended periods, and contacts, weight loads, and pressures remain continuous and can lead to adverse medical complications as discussed.

It would, therefore, be a significant improvement in the art and technology to provide automated, automatic wheelchair seat adjustments, in order to shift a wheelchair occupant to relieve prolonged contacts, weight loads, and pressures. Such improvement can yield significant medical and therapeutic advantages and other benefits for the wheelchair occupant, as well as provide greater comfort and wider latitude in desired positioning and repositioning for the occupant.

SUMMARY OF THE INVENTION

An embodiment of the invention is a wheelchair having an automated automatically controlled seat position adjuster. The wheelchair includes a base, a seat pivotally connected to the base, an actuator connected to the base and the seat, and a controller programmed to periodically vary position of the seat with respect to the base. In further aspects, the wheelchair includes a sensor connected to the controller for determining position of the seat at intervals, in order to selectively vary operations of the controller in varying position of the seat with respect to the base Another embodiment of the invention is a method of operating a wheelchair. The method includes providing a seat pivotally connected to a base, for at least two degrees of freedom of movement of the seat with respect to the base, automatedly shifting the seat with respect to the base, sensing a position of the seat upon the step of automatedly shifting, and varying the step of automatedly shifting in response to the step of sensing.

Yet another embodiment of the invention is a wheelchair. The wheelchair includes a base, including powered features, a seat pivotally connected to the base, for at least two directions of freedom of movement of the seat with respect to the base, a first actuator connected to the seat and the base, a second actuator connected to the seat, perpendicularly to the first actuator, and the base, a controller connected to the first actuator and the second actuator, a user interface panel connected to the controller, a program of the controller, operable via the user interface panel, for periodically activating the first activator and the second activator according to the program, and a sensor connected to the controller, for determining position of the seat. The program, at intervals, operates the controller to adjust the seat in respect to the base in order to vary positioning of the seat and the sensor signals the controller based on determining position of the seat as input to the program.

Another embodiment of the invention is a controller module for a wheelchair. The wheelchair includes a seat pivotally connected to a base, and the seat is moveable with respect to the base by a powered actuator. The controller module includes a microprocessor connected to the powered actuator for controlling operation of the powered actuator, a sensor connected to the microprocessor, the sensor detects position of the seat with respect to the base, the sensor capable of communicating a signal to the microprocessor indicative of seat position with respect to the base, and a program of the microprocessor, operable in accordance with input of the signal of the sensor, for logically operating the microprocessor to control the powered actuator to move the seat with respect to the base at select instant.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
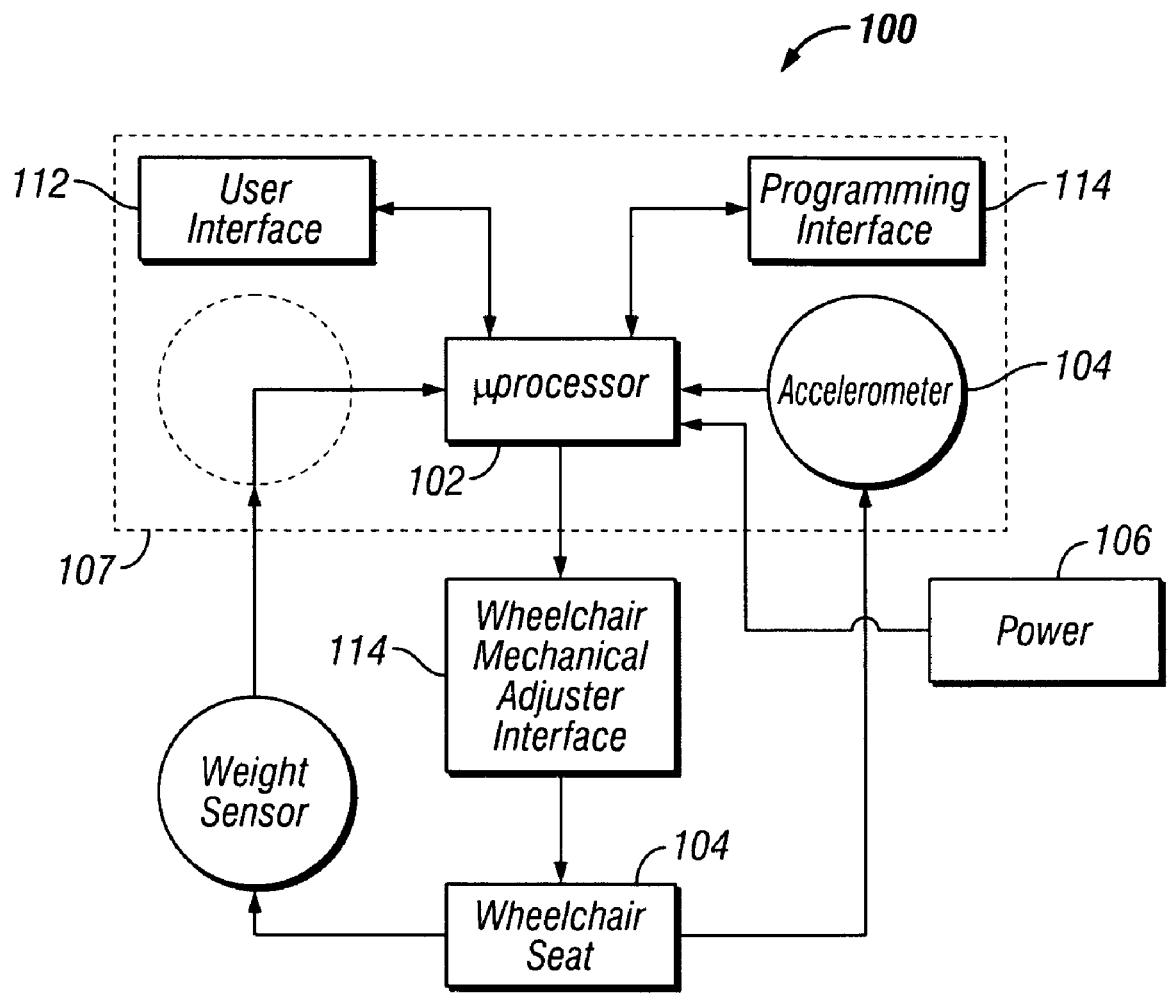
FIG. 1 illustrates a repositioner for a wheelchair, including a microprocessor for controlling wheelchair seat movement with respect to the wheelchair base, a sensor providing information of detected seat position to the microprocessor for operations, according to certain embodiments of the invention.

Referring to FIG. 1, a repositioner 100 automatically and automatedly shifts and changes seat position. The repositioner 100 is for use, for example, to automatically and automatedly vary position of a wheelchair seat 104 or other seat or support device. As used herein, the terms "automatic" and "automatically" mean acting or operating in a manner essentially independent of external influence or control, such as self-moving without requirement of manual operation or manipulation; and the terms "automated" and "automatedly" mean the automatic operation or control of process, equipment or system, and the techniques and equipment used for and to provide such automatic operation or control. In embodiments, the repositioner 100 operates to vary the seat position over any range and directions, including infinite or finite degrees of freedom of movement, according to desired design and configuration of the repositioner 100, as will be understood. The repositioner 100 includes a microprocessor 102, or other logic or controller circuit or element. Data memory and/or buffers (not shown in FIG. 1) are included with the microprocessor 102 and/or connected to the microprocessor 102 of the repositioner 100. The data memory/buffers operate, as is typical, in conjunction with the microprocessor 102, as data storage (temporary, permanent or otherwise) in processing, logic, and control functions.

A power source 106, such as a battery, electrical outlet or other source (e.g., AC or DC electric, gas or liquid pressure, spring, lever, solar, or other), connects to and powers the microprocessor 102. The repositioner 100 includes the power source 106, such as a battery, e.g., internally in a housing 107 (shown in phantom in FIG. 1) of the repositioner 100; includes connection coupling to the power source 106, e.g., if external to the repositioner 100 (as shown in FIG. 1) such as an AC electrical outlet; and/or is otherwise connectable to the power source 106.

The repositioner 100 additionally includes a sensor 108. The sensor 104 is connected to the microprocessor 102. The sensor 108 senses, detects, identifies and/or determines, for example, position or other condition of the wheelchair seat 104. In certain embodiments, the sensor 108 is a 3-axis sensor that detects inclination in at least two directions, e.g., pitch and yaw (and/or roll, as applicable). The sensor 108 feeds back information of the sensed inclination condition to the microprocessor 102. The sensor 108 can be internal (not shown) or external (shown in FIG. 1) to the housing 107 of the repositioner 100, and connects to the seat 104 sufficiently to sense the applicable condition. If the sensor 108 is external to the housing 107 of the repositioner 100, a connection coupling of the repositioner 100, or other sufficient connection, connects the sensor 108 to the microprocessor 102. Alternately, the sensor 100 is or includes one or more other types of seat position sensor, such as, for example, accelerometer, gyroscope, level/angle measurement gauge (e.g., mercury, water, or other fluid), weighted gear and sensing teeth of the gear (e.g., to detect setting or position via gear weighting), gear and measured movement via the gear, pendulum (e.g., including in fluid, that may be viscous or otherwise), level sensing device, or any other positional, directional or relational sensor. The term "sensor" includes all possible alternatives, as will be understood.

The repositioner 100, in certain embodiments, additionally includes a weight sensor 110. The weight sensor 108 is connected to the microprocessor 102. The weight sensor 108 senses, for example, weight(s) or other condition against the wheelchair seat 104 because of the seat occupant's body. The weight sensor 104 is sufficiently connected to the seat 104 to perform such sensing of the condition. The weight sensor 110 can be capable of sensing single or plural condition(s) as to the seat, as desired for the particular application and design. Information of the condition(s) so sensed is ascertainable to the microprocessor 102. The weight sensor 110 can be internal (shown in phantom in FIG. 1) or external to the repositioner 100 in various alternatives. If external, the weight sensor 110 is sufficiently connected to the microprocessor 102, for example, by a connection coupling of the repositioner 100, to make the information of sensed condition determinable by the microprocessor 102.

In various alternatives, the repositioner 100 includes a user interface 112. The user interface 112 is connected to the microprocessor 102. Via the user interface 112, commands and variables are input to the repositioner 100 for operations of the microprocessor 102 therewith. The user interface 112 is any input device to the repositioner 100, internal (shown in FIG. 1 as incorporated in the repositioner 100) or external (not shown) to the housing 107 and/or repositioner 100. The user interface 112 allows input to direct and control operations via the microprocessor 102, such as for override of automatic automated operations, initiation of microprocessor 102 automatic automated control, and/or settings, variables and menu selection among alternate automatic automated operation schemes and the like. Examples of the user interface 112 include a key-pad, a cell phone connected to the repositioner, a joy-stick, buttons, switches, microphone (for voice-enabled activation), eye or body motion detectors, touch display, LCD, TFT, LED or other screen, and any other of a wide variety of input devices now or hereafter available. The user interface 112 can further include output displays, screen, alarms, or other output signals, allowing user choice to the user interface 112, such as menu selections, settings, switches, options choice, data input, and other alternates and additions.

Moreover, the repositioner 100 additionally or alternatively includes other input connections, such as Bluetooth, RJ-45, Ethernet, direct wire, wireless (e.g., 802.11, cellular data, or other), optical, and other jacks or couplings. Various peripheral devices, such as other sensors, transducers, power sources, computers, cell phones, PDA's input/output device, and any other of a wide variety of peripherals, are operable in input and/or output connection to the repositioner 100 (i.e., and/or its microprocessor 102 or other elements). One such possible input/output connection is a programming interface 114 to the repositioner 100 and its microprocessor 102. The programming interface 114 allows access, through input/output connection, to program operations of the microprocessor 102. The programming interface 114 can be incorporated in the repositioner 100 (shown in FIG. 1), or (in certain arrangements, not shown in FIG. 1) external to and connected via coupling or plug with, wirelessly connected to, and/or otherwise communicatively or operatively connected to the repositioner 100. Varieties of peripherals and connection alternatives are includable or substitutable.

The repositioner 100 is connected, via one or more output links (such as optical or electrical wires or the like), to a mechanical adjuster interface 114. The mechanical adjuster interface 114 includes connections to powered mechanical components of the wheelchair. These powered mechanical components, include, for example, joints, pistons, and frame structures, and connect to the wheelchair seat and base. The mechanical components include motors or other powered elements that, together with the other mechanical components and the wheelchair structure design, are capable of moving the wheelchair seat with respect to the wheelchair base. Further details of certain embodiments of a wheelchair and seat combination, operable by the repositioner 100 in the manners herein contemplated, are later further detailed. Various and alternate embodiments of the mechanical adjuster interface 114, and powered mechanical or other components and options thereof and therefor, provide finite, infinite, varied, or other desired or possible degrees of freedom of movement of the wheelchair seat, as will be understood.

The microprocessor 102 includes or operates by inputs of software and/or hardware logic and instruction (or other processing control). The microprocessor 102 processing control operates in desired manner for automatically automatedly controlling repositioning of the wheelchair seat 104 or other applicable support device, intermittently or as may be programmed or otherwise dictated. Change of the logic and instruction, by programming change through the programming interface 114, alters control operations by the microprocessor 102, such as changes to repositioning speeds, frequency, variation and others. Additionally, various variables, settings, menu options, and the like, are changeable via communicative connections to or through the programming interface 114. For example, manual control is implementable, such as by override of microprocessor control via inputs, software, kill switch, safety buttons, triggers or flags, or other similar manual inputs and controls.

For example, certain embodiments of the logic and instruction operations for the microprocessor 102 allow and display menu options or choices about settings or programs. The options available can be tailored to the particular occupant user, standardized as prestructured repetitions and adjustment actions, structured for different settings of use (e.g., one for watching TV, another for sleep, and yet others for exercise of select body parts or conditions, maintenance of positioning of certain body areas versus others, limits on extents of variability of adjustment of all or parts, and many others). Timing aspects, such as day protocols versus night protocols for the shifting adjustment controlled by the programming, and a wide host of other application specific or more generalized applicability are possible by the programming and menus and options that are included. Also, embodiments can provide security features, such as password and log-in or other restrictive access, for change of programming or settings for programmed selections. Wide variation of other changes and inputs via the programming interface 114, and affecting the microprocessor 102 and its operation and/or other aspects of the repositioner 100 and operations, is possible.

In certain embodiments, the programming and options for adjustments by the repositioner 100 are preset and provide selection from among several options for preset sequence, shift timing, timing between shifting, substantially continuous small incremental shifting, and other preprogrammed selections. In other embodiments, external sources can provide the particular programming, with varied options, to the repositioner 100 for use by it. The various input connections to the repositioner 100, previously described (e.g., Bluetooth, Ethernet, RJ-45, wireless, etc.), allow for additional or changed programming of operations of the repositioner 100. External sources, peripherals and devices can control, or input software or hardware programming for control, to the repositioner 100, and select operations of or for other and future adjustment routines and the like can be supplied to control adjustment. Further, those skilled in the art will now or in the future know and understand the wide variety of options and possibilities Referring to FIG. 2, in operation such as with a wheelchair for shifting the wheelchair seat to change an occupant's contacts, pressures, weight, and loadings thereon, the repositioner 100 performs a method 200 to periodically shift the wheelchair seat. The repositioner 100 is activated to perform the method 200 by turning on power to the repositioner 100 (such as via switch or the like). The repositioner 100 is deactivated by turning off power thereto, and the method 200 is not performed (e.g., an override mode is provided, as well as a complete shut-down of the repositioner 100). Activation and deactivation of the repositioner 100, when the repositioner 100 has already been physically connected to the wheelchair and seat as later described, is performed in a step 202 of inputting to the user interface by the user occupant (or assistant). The user occupant (or assistant) additionally can, in certain embodiments, input or cause to be input further, other, or varied directions through menus and option selection through inputting to the user interface in the step 202. As an example, when the repositioner 100 is activated on, the repositioner 100, according to desired configuration, can automatically commence a programmed adjustment sequence or can require additional input in the step 202 to actually commence such as sequence, or combinations or variations as applicable. As mentioned, finite, infinite, varied, or other degrees of freedom are controlled or provided for per the programming and options, as will be understood.

Whatever the particular configuration, when the repositioner 100 is activated (e.g., turned on), the repositioner 100 controls operations (either because turned on or via further input in the step 202, according to configuration details) of the mechanical components and powering of them, to time and make adjustment of the wheelchair seat with respect to the base, according to programs operating on the microprocessor 102. As an example of operation of a predetermined program of the microprocessor 102, the microprocessor 102, at periodic time intervals, signals to switch on power to and controls powering of motors, pistons or the like causing selected mechanical components to move to recline the seat with respect to the base. Of course, other adjustments to the seat with respect to the base, such as to tilt, upright, and otherwise move the seat with respect to the base are possible, as well, in accordance with programs for operations.

Manual control (such as by override or disengagement of automatic and/or automated control) is possible during operations, and/or at varied times, points, or periods of the operations, in certain embodiments. For example, the interface, software, ancillary switch, lever, button, or other physical or programmed disengagement mechanism or control allows the occupant (or another, as applicable) to turn off or alter the automated and/or automatic operations. Events, such as operational fault, wheelchair drive wheel movement on a surface, seat position considerations and circumstances, weight or body shifts, center of gravity, momentum and other physical force situations or effects, can either automatically, by human intervention, or combinations, deactivate or cause change to the automatic and/or automated operations. Safety and health considerations, as well, in addition to occupant interaction and the like, can be automated, programmed or otherwise accounted to turn off or override the operations, and these and other wide choice of variations of events, factors, circumstances and situations provide opportunity in design and use in deactivation, change, and other operational states and conditions.

Figure 2:
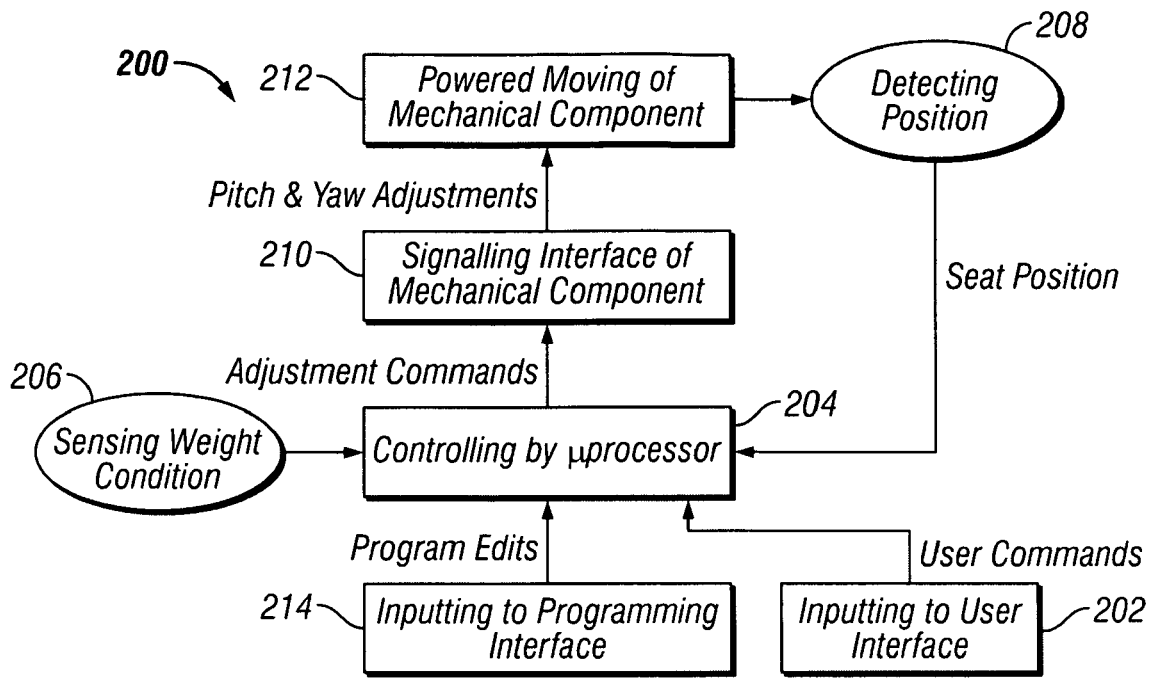
FIG. 2 illustrates a method of repositioning a wheelchair seat with respect to the base, including controlling of an automated adjuster for changing position of the seat, according to certain embodiments of the invention.

Continuing to refer to FIG. 2, after the step 202 of inputting to the user interface, a step 204 of controlling by the microprocessor proceeds per programmed steps of software and hardware of the microprocessor, and pursuant to any options or selections made in the step 202 of inputting. The step 204 of controlling by the microprocessor also is dictated by information then available to the microprocessor from a step 206 of sensing of weight condition (and/or other conditions) at the seat and a step 208 of detecting position of the seat. During method 200, the microprocessor controls in the step 204 based on signaling from the steps 206 and 208.

In a step 210 of signaling an interface of mechanical components operative to adjust/shift the seat, the step 204 by the microprocessor directs signals to the mechanical adjuster interface of the wheelchair. The interface, in response to microprocessor signals in the step 210, powers moving in a step 212 of the mechanical components that control position of the wheelchair seat. The powered moving of mechanical components in the step 212 varies/shifts the wheelchair seat position with respect to the wheelchair base. The powered moving in the step 212 adjusts the seat in this manner, and in accord with selective power on and off, and extent of power, of mechanical motors, pistons or the like that cause the mechanical component movements to shift the seat. The seat is thereby adjustingly shifted as so controlled by the microprocessor in the step 204, and through signaling the interface of the mechanical components in the step 210 and powered moving of the mechanical components in response in the step 212.

As the wheelchair seat moves with respect to the base per the programmed control, the accelerometer detects seat incline variations during the seat movement in a detecting position step 208. As previously mentioned, a 3-axis accelerometer in the step 208 detects inclination of the seat in at least two directions, e.g., pitch and yaw (and/or roll, if or as applicable). The step 208 of detecting position feeds back information of the sensed inclination condition to the microprocessor for processing and use in the step 204 of controlling. Similarly, the weight condition sensing step 206 (or sending of other conditions, if different or more than one type of sensor provides signaled information to the microprocessor, as in various alternatives) signals information to the microprocessor indicative of the sensed condition, and the microprocessor processes and uses the information in the step 204 of controlling. In effect, the step 204 of controlling by the microprocessor is capable of operating to correspond to any of a wide variety of conditions or detections as inputs, depending upon desired design, configuration, and programming.

Furthermore, a step 214 of inputting to a programming interface can vary operations or programming of the microprocessor in the step 204 of controlling. New, modified or substituted programs, and steps thereof, as well as variations to settings, accessibility, parameters, speeds, angles, and other aspects of controlling in the step 204, can be input in the step 214. The step 214 can occur, depending on application and situation, concurrent with the step 204 of controlling, can occur whenever the step 204 of is not activated and being performed, or otherwise or combinations. Peripheral devices, such as computers, memory storage devices, cell phone, other controls or other program input devices, are connectable and can perform the step 214, also in accordance with design and application.

Those skilled in the art will now or in the future know and understand wide variations and possible alternatives in much of the foregoing, including, for example, as to repositioner features, components, and operations, programs and programming, control and program enhancements/modifications, power sources, microprocessor or controller choices, sensor options, features, and operations, connections between elements and features (as to the repositioner, the microprocessor, interfaces, mechanical components, and motors, pistons and like), formats of menus and input interfaces, settings, conditions, variables, performance, speeds, timing, and a wide variety of other conditions and configurations. All such variations and alternatives are included.

Figure 3:
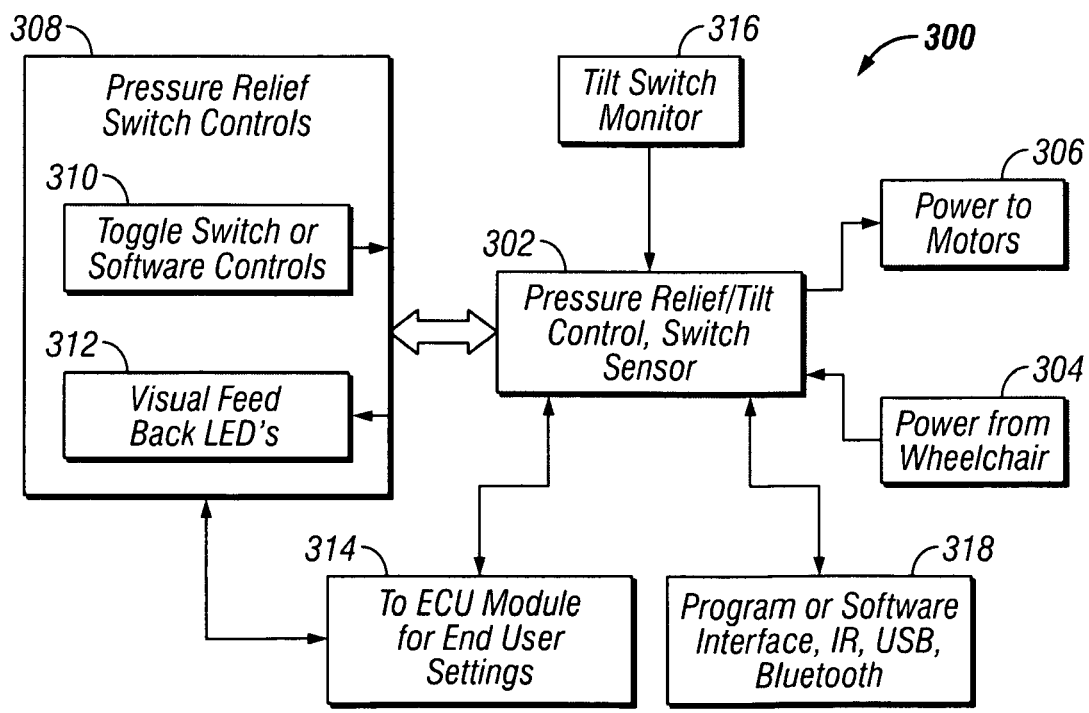
FIG. 3 illustrates a controller module for a wheelchair, the controller module is programmed to adjust the wheelchair seat in pivotal attachment to the base, in order to periodically vary seat position (and contact pressures, weights and loads a wheelchair occupant in the seat), according to certain embodiments of the invention.

Referring to FIG. 3, a control module 300, and example of and operable as the repositioner 100 of FIG. 1 and per the method of FIG. 2, includes a pressure relief/tilt controller 302. The controller 302 includes logic and instruction programs. The controller 302 is connected to a power supply 304, such as batteries or the like available in power wheeled wheelchairs. As may be required, adapters (not shown) regulate voltage and current to the controller 302 from the power supply 304. The controller 302 switches power on and off to powered motors 306 capable of automatedly adjusting a wheelchair seat or the like.

A user interface control panel 308 is connected to the controller 302. The panel 308 includes a toggle switch 310 (or, alternatively, buttons, touch pad, or other input for software control). The panel 308 also includes a visual display 320, such as a TFT/LCD screen. The controller 302 is connected to an electronic control module 314, and the module 314 is connected to the control panel 308. As shown by the arrow in FIG. 3 (i.e., between the control panel 308 and the controller 308), the control panel 308 permits input to the controller 302 for select operations by the controller 302, and the controller 302 outputs to the control panel 308 signals indicative of operations and states of controlling by the controller 302.

The controller 302 is further connected to a monitor 316, such as the accelerometer, level sensing device, or other position sensor, previously mentioned as to the repositioner 100 described above. Although the monitor 316 is contemplated for purposes of wheelchair seat adjustment use to be (or include) a tilt sensor, other monitoring of conditions, states, weights, and other indicia are also possible depending on the particular type of the monitor 316. The monitor 316 can be a single unit/function, or a plurality of different or similar units/functions, or combinations. Moreover, the monitor 316, if multiple units/functions, is operable with all units in conjunction and synchrony, or synchronization and logical selections of monitored conditions by multiple units as the monitor 314 are handled by programming and instructions of the controller 302 and its operation.

Additionally, the controller 302 connects to a software and/or hardware program 318 for operating the controller 302. The connection of the program 318 to the controller 302 can be via connected memory (such as RAM, ROM, EPROM, drive or other storage). Moreover, the program 318 is connectable to the controller 302 as an external peripheral device or software, such as by USB, Bluetooth, Infrared, wireless, or other storage device communicatively connected to the controller 302 (e.g., through applicable connective plugs or features).

Figure 4:
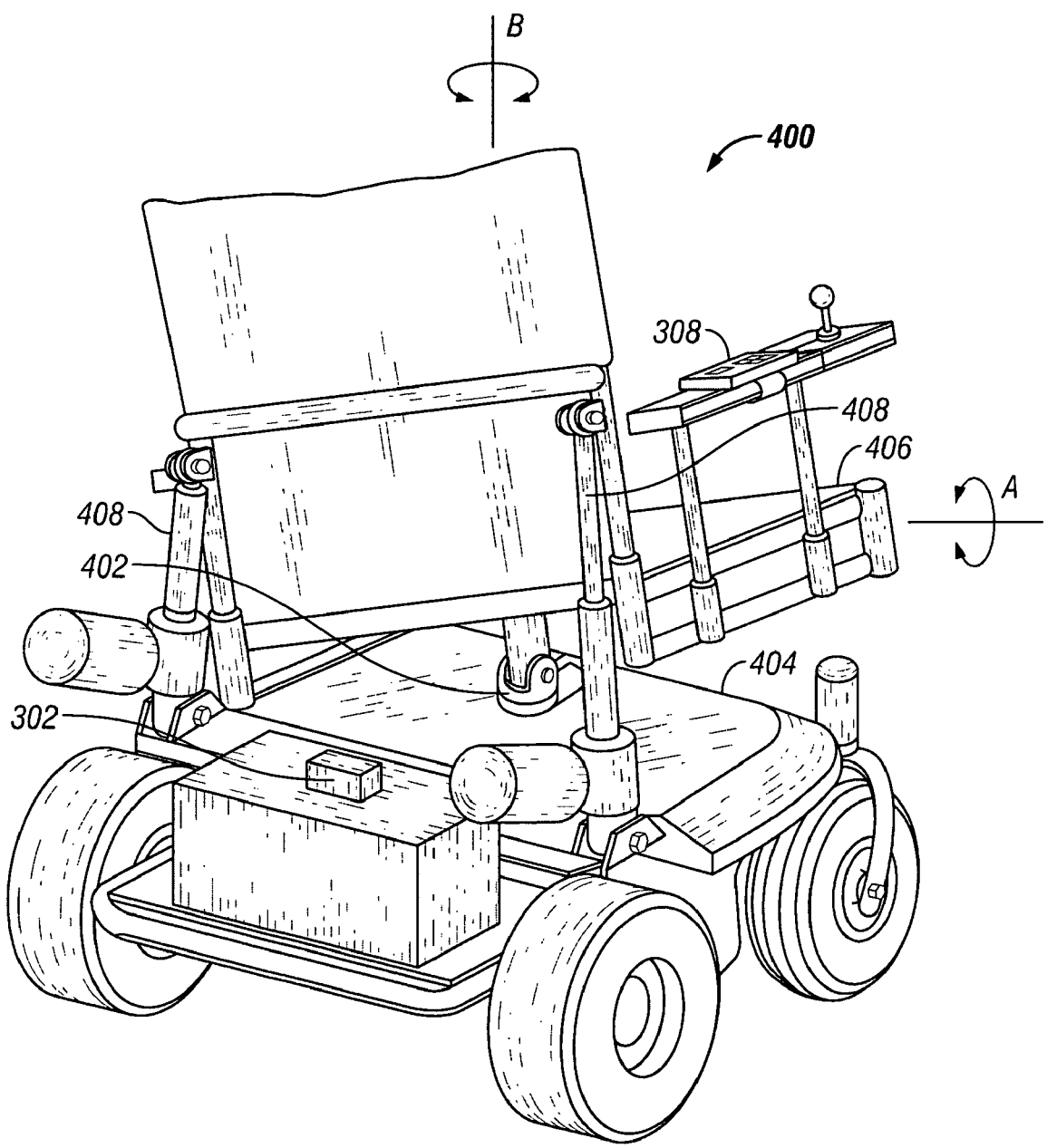
FIG. 4 illustrates a wheelchair connected with the controller module of FIG. 3, the wheelchair including dual actuators and the seat pivotally connected to the base, the controller module operates the actuators to move the seat with respect to the base in accordance with a preprogrammed sequence for periodically varying the seat position (and contact pressures, weights and loads a wheelchair occupant in the seat), according to certain embodiments of the invention.

Referring to FIG. 4, a wheelchair 400 is fitted with the control module 300. The wheelchair 400 includes a pivot joint 402 connecting a wheelchair base 404 and a wheelchair seat 406. The pivot joint 402 allows at least two degrees of movement of the seat 406 with respect to the base 404, for example, pitch (rotation side to side) indicated by arrow A and yaw (rotation around vertical axis) indicated by arrow B. Although at least two degrees of freedom of movement of the seat, it is to be understood that infinite or finite movement is potentially possible, as desired in the embodiment, in keeping with the applicable configuration and design alternatives, as will be understood.

The seat 406 and the base 404 are also connected to an actuator 408. The actuator 408 is, for example, dual mechanical extension/contraction actuators (as shown for example purposes in FIG. 4) fixed to operationally extend and contract in substantially perpendicular opposing directions. Other variations of mechanical and other components can be or be included in the actuator 408, including for example gears, levers, screws, one or more mechanically extending and contracting elements, and others, as will be understood. Other operational implementations, direction relationships, and placement of dual mechanical actuators or other such actuator elements and designs are possible, as well. For purposes of the example actuator 408 of FIG. 4, the actuator 408 (shown as dual actuator assemblies in FIG. 4, connecting at perpendicular opposing locations with respect to the seat and the base), includes a motor drive to extend and contract lengthwise. The actuator 408 of FIG. 4, when powered to extend/contract, rotates the seat as to pitch and yaw with respect to the base. Of course, all or other degrees of freedom of movement are possible in accordance with the design and configuration of the actuator 408 and implementation in any instance, and a wide variety of possibilities, considerations, and designs will be understood hereunder.

The control module 300 includes the pressure relief/tilt controller 302. The controller 302 is mounted on the wheelchair 400, for example, at the base 404. The controller 302, as previously mentioned, is powered by power source of the wheelchair 400 (for example, in the case of a powered wheel wheelchair or the like) or includes its own power source or connection. The controller 302 is connected to the actuator 408, to selectively (per programming and direction via the controller 302) power and operate the actuator 408 to vary positioning of the seat 406 as to the base 404. The controller 302 is also connected to the user interface control panel 308. The control panel 308 is mounted in a location of the wheelchair for accessibility as a user interface to the controller 302 operations; for example, the panel 308 is attached to an arm or other structure of the seat 406 or other.

Retrofit of legacy wheelchairs is possible with the control module 300. For example, wheelchair seats can be pivotally attached to the base. Further, existing actuation mechanisms of certain wheelchairs can be controlled by the control module 300. Connections of the control module 300 to operate actuation mechanism(s), and other retrofit options and alternatives, will now and in the future be understood to those skilled in the art, and all such options, alternatives and arrangements are included herein.

Other alternatives are possible in keeping with the foregoing and all such alternatives are included herein. A wide variety of materials and parts are possible. Attachment and connection mechanisms include all possibilities. External and internal power sources and supplies are incorporable. Substituted, additional or replaceable elements, including, for example, controller microprocessor, programs, inputs and outputs, operations to vary seat position, seat and actuator types, features and arrangement, other switches, circuits, and triggers, safety devices, alarms, and cut-offs, and others. Moreover, the particular aspects of controller operations and programming, including the designs and methods, means or mode of seat adjustment operations, and other aspects, are variable and include all possibilities for every included application and use. All possible applications of the devices and processes are included, for example, beds or other supports are similarly controllable and configurable to vary occupant position via the support movement.

The conditions or states sensed for seat positioning operations, and variations thereof, can include additions, alternatives, and/or substitutes. In embodiments, occupation (or not) of the seat, position in the seat, weight loadings at and over the seat, tilt circumstances, concurrent movement of the entire wheelchair or other operations of the wheelchair, and other matters can be sensed or otherwise detected in the automatic/automated operations, and these can affect the operations in accordance with programming, design, and control arrangements, as desired or implemented. If the wheelchair seat is not occupied, for example, then the automated/automatic operations are inoperable in certain embodiments according to design. Occupant (or other person) options for repositioning, and states of the wheelchair, seat or other aspect, may be programmable by the occupant or in accordance with desires, in certain embodiments. Alarms (audible, visual and/or haptic) are includable, either optionally or integrated, to alert the occupant prior to repositioning or other automated/automatic, manual or other operations or events. For example, an alarm may provide the occupant notice of an impending repositioning operation and allow opportunity for variation of the operation, such as cancellation or other change. Because control is provided through microprocessor, software, programming, and/or other design for the automated and automatic in operations, wide variation of possible variables and conditions can be accounted for and logical operations are possible. In fact, weight sensing (such as over the surface of the seat or other, at various points of contact or the like), can provide inputs to for logical processing, such as incorporating simulation and modeling and the like, to reposition in accordance with occupant-tailored or other operations applicable to the conditions, health needs, and the like of the occupant. Additional variations allow for "smart" (i.e., such as artificial intelligence) types of operations, based on variables and sensed states and the like.

In certain alternative embodiments, the foregoing systems allow for other seat manipulation and variation on the base. One possibility includes a vibration action for the seat. The vibration action can be controlled by the same controller previously described, and can respond to sensed signals to effect activation (similar to the foregoing or others, including manual activation). For example, the vibration action can be provided by actuators or other mechanisms attached to the seat. Alternately, a modular component for controlling the vibration action is connectable to the controller and provides interfaces, direction, control, and other operations to enable and yield the vibration. Moreover, the vibratory action can be performed in response to any of a wide variety of sensed variables as to the seat, occupant condition and state, timing, scheduling, or others. For example, such modular component for the vibrating operations can include sensors (of the types described herein or otherwise as may be applicable) for attachment to the seat. The modular component is attachable to the seat frame or other feature. Other alternatives include the vibration action control and mechanisms in the same unit as the foregoing repositioner systems or other features of the seat. Of course, such vibration control and action can be employed for other surfaces in contact with a person, such as beds, fixed chairs, and the like. Vibration action in this manner can be particularly desired by those who are not easily capable of movement in relation to the surface and can otherwise improve blood circulation, muscle toning/stretching, and the like.

In certain alternatives, the seat includes a pressure sensor, either alone as the sensor or in combination with the position sensor previously described. The pressure sensor includes a pressure transducer connected to the seat of the wheelchair or other surface. The pressure transducer is, for example, an array of pressure sensors positioned selectively or in some arrangement connected to the seat or other surface. The pressure transducer (or array) signals the controller of the system previously described, and the controller automatically (or via manual control interruption) operates the automated features of the seat or other surface, in order to reposition, tilt or otherwise move the surface (or portions thereof). The pressure sensor, in effect, serves to change or vary pressures of the seat in accord with the signal from the pressure transducer and control of the controller and automated/automatic operations of the assembly. The pressure sensor arrangement, in addition to controlling the automated/automatic repositioner system of the seat or other surface, can provide for controller and controlled operations that affect seat (or other surface) mechanical, pressure or other variable features. For example, seat cushion air pockets, supports, or the like can additionally (or alternatively) be adjusted/varied in accordance with the foregoing systems. Of course, programming, operations, controls, and the other aspects of the foregoing embodiments are appropriately and desirably programmed and effected to provide for the pressure sensor arrangement, its operations and effects, and any added features that are similarly controllable. Time periods, programmed control, and other variables can result in various reactive control by the systems, including, for example, the pressure sensor can detect pressure spikes to the seat or other surface and provide operative reactions in response (e.g., tilt, pressure variation as to cushions, alarms, or other possible results or effects). Of course, wide variation of options, possibilities, programming, controlled operations and the like are possible in such design, as will be understood.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wheelchair, comprising:
   a base, including powered features;
   a seat;
   a pivot joint connected to the base and to the seat, allowing at least two degrees of rotational freedom of movement of the seat with respect to the base;
   a first actuator connected to the seat and the base;
   a second actuator connected to the seat and the base;
   a controller connected to the first actuator and the second actuator, providing at least one programmed operation;
   a 3-axis accelerometer connected to the seat and the controller, for determining position of the seat in the at least two directions;
   a weight sensor connected to seat and the controller, for detecting loading conditions on the seat;
   a user interface panel connected to the controller, for operating the controller to perform the at least one programmed operation;
   wherein the controller, upon initiation of the at least one programmed operation via the user interface panel, automatedly, at intervals, operates the first actuator and the second actuator to vary positioning of the seat with respect to the base in response to loading conditions on the seat detected by the weight sensor.

2. The wheelchair of claim 1, wherein the controller, upon initiation of the at least one programmed operation via the user interface panel and in response to loading conditions on the seat detected by the weight sensor, operates the first actuator and the second actuator to, at intervals, vary position of the seat with respect to the base, to provide medical advantage by shifting loading on the seat.

* * * * *